US008843409B2

(12) United States Patent
Rao

(10) Patent No.: US 8,843,409 B2
(45) Date of Patent: Sep. 23, 2014

(54) POLICY EVENT MANAGEMENT SYSTEM AND METHOD

(75) Inventor: Nagaraj V. Rao, Flower Mound, TX (US)

(73) Assignee: Webcetera, L.P., Flower Mound, TX (US)

( * ) Notice: Subject to any disclaimer, the term of this patent is extended or adjusted under 35 U.S.C. 154(b) by 106 days.

(21) Appl. No.: 13/269,019

(22) Filed: Oct. 7, 2011

(65) Prior Publication Data

US 2013/0090950 A1    Apr. 11, 2013

(51) Int. Cl.
*G06Q 40/00*    (2012.01)
*G06Q 40/08*    (2012.01)

(52) U.S. Cl.
CPC ..................... *G06Q 40/08* (2013.01)
USPC ................................. 705/37; 705/6

(58) Field of Classification Search
CPC ............................... G06Q 40/08; G06Q 40/00
USPC ............................. 705/35–40, 4, 6
See application file for complete search history.

(56) References Cited

U.S. PATENT DOCUMENTS

| 5,950,169 | A | 9/1999 | Borghesi et al. | |
|---|---|---|---|---|
| 6,594,635 | B1 | 7/2003 | Erlanger | |
| 7,124,088 | B2 | 10/2006 | Bauer et al. | |
| 7,240,017 | B2 | 7/2007 | Labelle et al. | |
| 7,277,861 | B1 | 10/2007 | Benson et al. | |
| 7,343,309 | B2 | 3/2008 | Ogawa et al. | |
| 7,395,219 | B2 | 7/2008 | Strech | |
| 7,490,050 | B2 | 2/2009 | Grover et al. | |
| 7,877,269 | B2 | 1/2011 | Bauer et al. | |
| 8,484,052 | B2 * | 7/2013 | Rogers et al. | 705/4 |
| 8,706,531 | B1 * | 4/2014 | Voigt et al. | 705/4 |
| 2004/0103012 | A1 * | 5/2004 | Nussbaum et al. | 705/4 |
| 2004/0148201 | A1 * | 7/2004 | Smith et al. | 705/4 |
| 2004/0172308 | A1 * | 9/2004 | Macchia | 705/4 |
| 2006/0136274 | A1 | 6/2006 | Olivier et al. | |
| 2008/0065426 | A1 * | 3/2008 | Ziade et al. | 705/4 |
| 2009/0030910 | A1 * | 1/2009 | Bennett et al. | 707/10 |
| 2010/0070308 | A1 | 3/2010 | Long, Sr. | |
| 2010/0100398 | A1 | 4/2010 | Auker et al. | |
| 2010/0153137 | A1 * | 6/2010 | Rao et al. | 705/4 |
| 2010/0174564 | A1 | 7/2010 | Stender et al. | |
| 2010/0223078 | A1 | 9/2010 | Willis et al. | |
| 2010/0324944 | A1 | 12/2010 | Rao | |
| 2011/0022417 | A1 | 1/2011 | Rao | |
| 2011/0040582 | A1 | 2/2011 | Mullins | |
| 2011/0112873 | A1 | 5/2011 | Allen et al. | |
| 2011/0307278 | A1 * | 12/2011 | Clarke et al. | 705/4 |
| 2012/0284058 | A1 * | 11/2012 | Varanasi et al. | 705/4 |

FOREIGN PATENT DOCUMENTS

WO        0116845        3/2001

* cited by examiner

*Primary Examiner* — Edward Baird
(74) *Attorney, Agent, or Firm* — James L. Baudino

(57) ABSTRACT

According to one aspect of the present disclosure, a method and technique for policy event management is disclosed. The method includes: receiving by a broker an electronic communication from an insurance provider of an event related to a policy of a consumer serviced by the insurance provider; responsive to receiving the notice, automatically determining whether the event meets at least one event criteria monitored by the broker; and responsive to determining that the event corresponds to at least one event criteria monitored by the broker, automatically initiating an action related to the event.

16 Claims, 4 Drawing Sheets

POLICY EVENT MANAGEMENT SYSTEM AND METHOD

BACKGROUND

Consumers looking for insurance products (e.g., automobile insurance, life insurance, home insurance, etc.) often utilize an insurance broker to obtain premium or cost information for the desired insurance product. The broker often communicates with different insurance providers on behalf of the consumer to obtain rate quote information for the consumer. The broker may also assist in facilitating the contract or policy of insurance between the consumer and the insurance provider. The broker often utilizes the Internet or other means for communicating with the different insurance providers to facilitate information gathering and policy specifics.

BRIEF SUMMARY

According to one aspect of the present disclosure a method and technique for policy event management is disclosed. The method includes: receiving by a broker an electronic communication from an insurance provider of an event related to a policy of a consumer serviced by the insurance provider; responsive to receiving the notice, automatically determining whether the event meets at least one event criteria monitored by the broker; and responsive to determining that the event corresponds to at least one event criteria monitored by the broker, automatically initiating an action related to the event.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
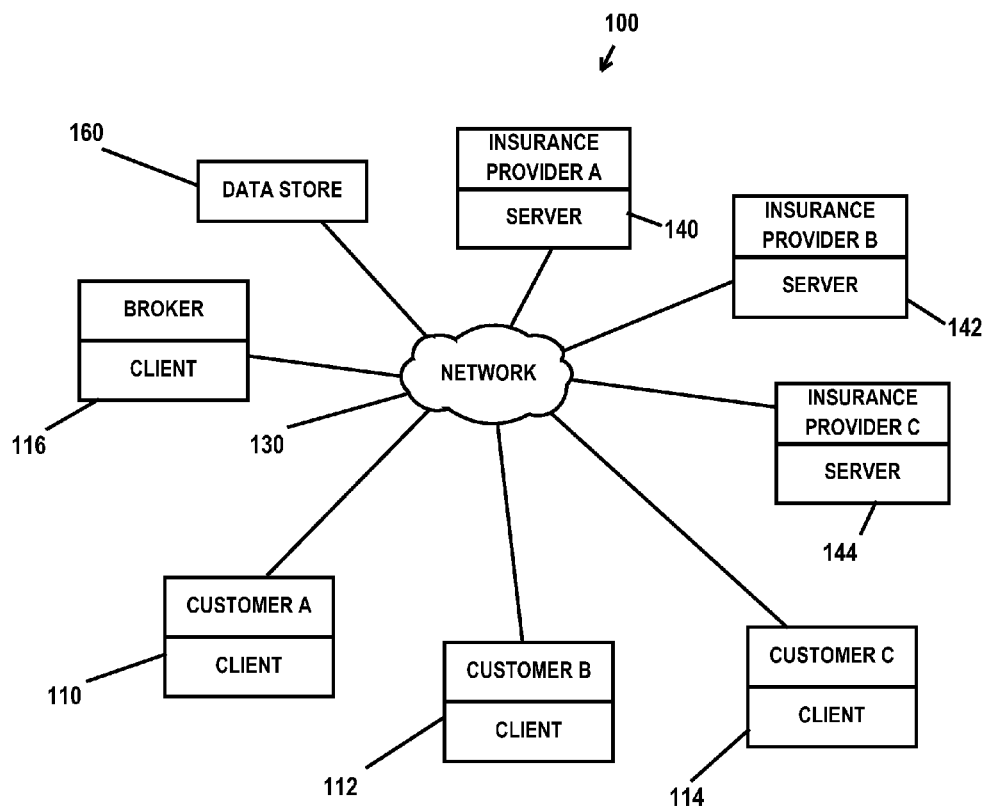
FIG. 1 is an embodiment of a network of data processing systems in which the illustrative embodiments of the present disclosure may be implemented.

Embodiments of the present disclosure provide a method, system and computer program product for policy event management. For example, in some embodiments, the method and technique includes: receiving by a broker an electronic communication from an insurance provider of an event related to a policy of a consumer serviced by the insurance provider; responsive to receiving the notice, automatically determining whether the event meets at least one event criteria monitored by the broker; and responsive to determining that the event corresponds to at least one event criteria monitored by the broker, automatically initiating an action related to the event. Embodiments of the present disclosure enable automatic policy event management by, for example, a broker for a consumer or potential consumer of an insurance product by automatically monitoring, detecting and responding to various types of policy-related events. In some instances, the system will automatically seek rate quotes on behalf of the consumer based on a type of event detected.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples of the computer readable storage medium may include, but not be limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
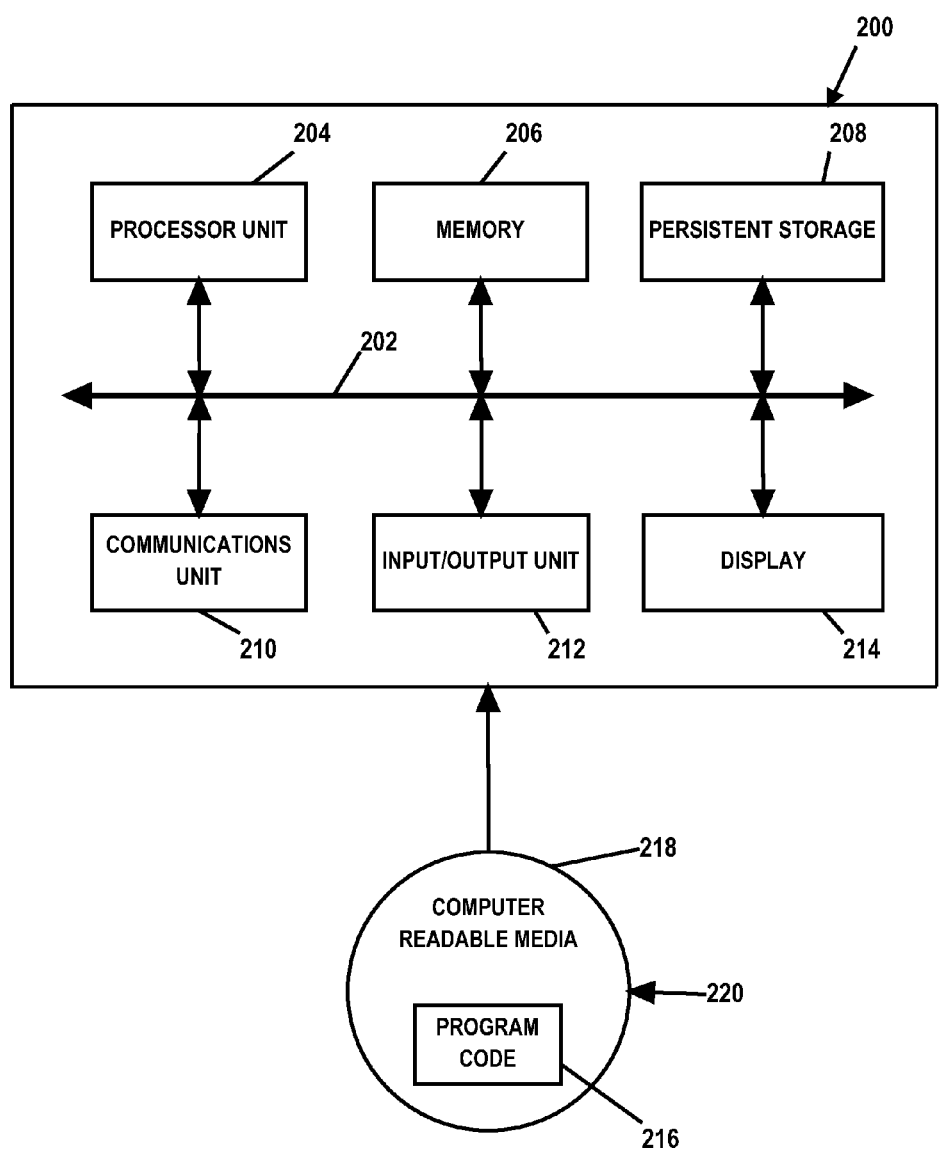
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, servers 140, 142 and 144 connect to network 130 along with data store 160. In addition, clients 110, 112, 114 and 116 connect to network 130. Clients 110, 112, 114 and 116 may be, for example, personal computers or network computers. In the depicted example, servers 140, 142 and 144 correspond to respective insurance providers A, B and C, clients 110, 112 and 114 correspond to customers or consumers of insurance products (e.g., insurance products offered and/or made available by insurance providers A, B and/or C), and client 116 is associated with an insurance broker that provides/sells insurance products to consumers (e.g., insurance products offered and/or made available by insurance providers A, B and/or C). For example, a broker as used herein may be any person that sells or otherwise provides an insurance product to a consumer (e.g., independent of whether the seller is representing the interest of the consumer (e.g., broker) or the insurance provider (e.g., agent)). Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 116 and/or server 140 in which an embodiment of a policy event management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable. Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
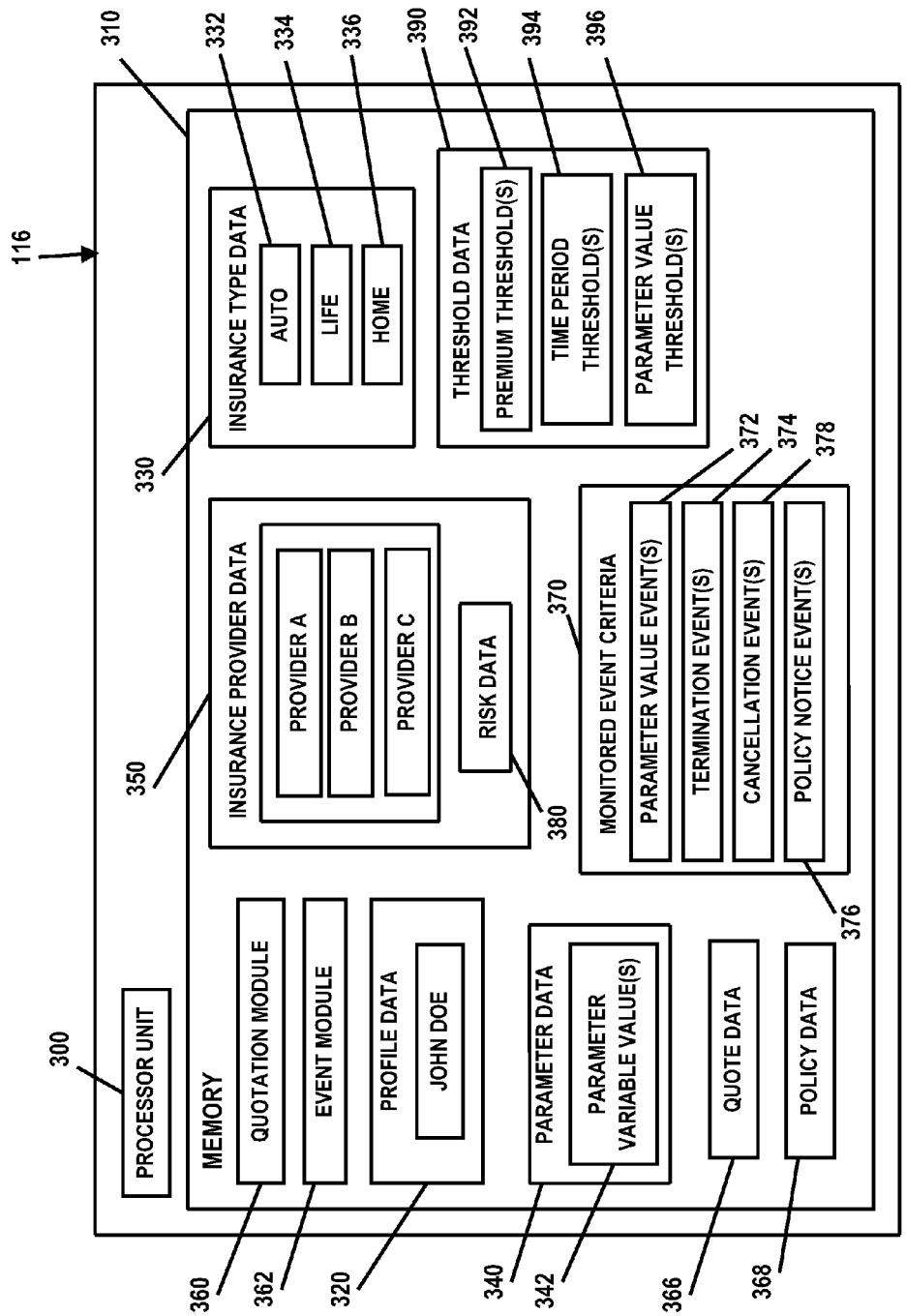
FIG. 3 is a diagram illustrating an embodiment of a data processing system for policy event management in which illustrative embodiments of the present disclosure may be implemented.

FIG. 3 is an illustrative embodiment of a system 300 for policy event management. System 300 may be implemented on data processing systems or platforms such as, but not limited to, client 116 or at other data processing system locations. For example, in some embodiments, policy management system 300 is operated and/or otherwise utilized by an insurance broker. However, it should also be understood that various embodiments of policy management system 300 may be operated and/or utilized by insurance providers (e.g., on a platform such as server 140).

In FIG. 3, client 116 includes a processor unit 300 and a memory 310. In general, processor unit 300 processes and/or executes instructions (e.g., software code) and performs logic calculations while memory 310 temporarily or permanently stores information that may be retrieved therefrom. In FIG. 3, memory 310 includes profile data 320, insurance type data 330, and parameter data 340. Profile data 320 comprises information associated with a particular consumer or customer who may be seeking an insurance product, seeking an insurance rate quote(s) and/or may be an existing customer who already purchased an insurance product (e.g., via an insurance broker). For example, in FIG. 3 profile data 320 contains information for consumer John Doe. Insurance type data 330 comprises information associated with a desired and/or purchased type of insurance. For example, in FIG. 3, insurance type data 330 comprises information associated with an auto insurance type 332, a life insurance type 334 and a dwelling or home insurance type 336; however, it should be understood that different types of insurance information/types may be included/represented. Parameter data 340 comprises information associated with different parameters associated with a particular type of insurance. For example, for an auto type 332 of insurance, parameter data 340 comprises different parameter variable values 342 corresponding to auto insurance such as, but not limited to, a deductible amount, a coverage amount, the type of vehicle, the address (e.g., street/city/zip code) of the user or where the vehicle will be located, the age of the insured, etc. Information included in profile data 320, insurance type data 330 and/or parameter data 340 may be received from or selected by a broker or other user of client 116. For example, information associated with profile data 320 may be input by a broker/user and stored by client 116 as profile data 320. Further, a particular type of insurance may be selected by a broker/user and, based on the selection, different parameter options associated with the selected type of insurance may be provided to the broker/user for input/selection. The type of insurance and selection of parameter values are stored by client 116 as insurance type data 330 and parameter data 340. It should be understood various types of information associated with the type of insurance and parameter values for a particular type of insurance may be pre-stored in memory 310 and presented to the broker/user through one or more input screens or data entry interfaces.

Memory 310 also includes insurance provider data 350. Insurance provider data 350 comprises information associated with different providers of insurance offerings (e.g., insurance providers A, B and C). The information stored as insurance provider data 350 may be predefined and stored in memory 310 (e.g., indicating that particular insurance providers offer particular insurance types, the particular parameter values available through particular insurance providers (such as coverage limits), etc.). It should be understood that insurance provider data 350 may be obtained by client 116 communicating with computers servers 140, 142 and/or 144 via network 130 to inquire whether insurance providers (e.g., insurance providers A, B and C) offer a particular type of insurance. In some embodiments, polling of insurance providers may be made to determine the different types of insurance offered by different providers. Information associated with different insurance providers may also be automatically updated in response to updates automatically received from servers 140, 142 and/or 144 (e.g., without a prompt or request from client 116). In some embodiments, information may be collected from insurance providers according to a predetermined schedule to periodically update information stored in memory 310.

Memory 310 also has stored therein a quotation module 360 and an event module 362. Quotation module 360 functions to interface with servers 140, 142 and/or 144 and obtain insurance premium estimates/quotes from insurance providers A, B and/or C. Event module 362 monitors, collects and/or analyzes various types of events associated with an insurance policy and/or consumer of an insurance policy. Quotation module 360 and event module 362 may be implemented in any suitable manner that may be hardware-based, software-based, or some combination of both. For example, quotation module 360 and/or event module 362 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In some embodiments, quotation module 360 is software (e.g., a set of instructions and/or an algorithm) that, when executed by processor unit 300, generates and/or otherwise provides an interface for receiving and storing parameter data 340, receiving and storing profile data 320, and interfacing with one or more insurance providers to obtain rate quotes from the insurance providers. Based on a particular insurance type 330 sought, quotation module 360 formulates and/or otherwise generates a request for a rate quote, and submits and/or otherwise electronically communicates the rate quote request to one or more insurance providers (e.g., servers 140, 142 and/or 144). Quotation module 360 receives the rate quote information from the respective insurance providers and stores the rate quote information in memory 310 as quote data 366. If a consumer purchases a particular insurance product (e.g., responsive to receiving/accepting a rate quote or otherwise), the policy information corresponding to the purchased insurance product may be stored in memory 310 as policy data 368.

In some embodiments, event module 362 is software (e.g., a set of instructions and/or an algorithm) that, when executed by processor unit 300, receives, collects and/or analyzes various events related to a consumer of an insurance product and/or a policy for an insurance product (e.g., a policy or contract for insurance entered into between a consumer and an insurance provider). For example, in the embodiment illustrated in FIG. 3, memory 310 includes monitored event criteria 370 comprising information associated with different types of events that may affect a policy for an insurance product (e.g., a cost or price of the insurance product, the date a policy expires or terminates, the cancellation of a policy by the consumer or insurance provider, the age of an insured consumer, etc.). In FIG. 3, monitored event criteria 370 include parameter value event(s) 372, termination event(s) 374, cancellation event(s) 376 and policy notice(s) 378. However, it should be understood that other event criteria may also be monitored.

Parameter value event(s) 372 may include events related to the consumer of the insurance product, such as values set forth in parameter data 340. For example, a change to an age of the consumer, a change in residence address, the occurrence of an automobile moving violation and/or other events may affect a policy for an insurance product (e.g., the cost of the insurance product). Changes to parameter values may be received from the insurance provider (e.g., an electronic communication such as an electronic mail notification), received from the consumer (e.g., an electronic communication such as an electronic mail notification), derived by event module 362 (e.g., deriving a change in age of a consumer based on birthday information stored as profile data 320 and/or parameter data 340) or otherwise obtained or received. Termination event(s) 374 comprises information associated with a future termination date(s) of an insurance product policy. Cancellation event(s) 376 comprises information associated with a cancellation of an insurance product policy (e.g., by the insurance provider or consumer). Information associated with termination event(s) 374 or cancellation event(s) 376 may be received from the insurance provider (e.g., an electronic communication such as an electronic mail notification), received from the consumer (e.g., an electronic communication such as an electronic mail notification), derived by event module 362 (e.g., deriving a termination date for a policy based on policy data 368) or otherwise obtained or received. Policy notice data 378 may comprise information associated with different types of notices received (e.g., by the broker) from an insurance provider relating a policy of insurance of a consumer that is a customer or client of the broker (e.g., a request for a student discount verification document, a policy premium renewal amount, a change in premium amount, etc.).

In some embodiments, event module 362 monitors, receives and/or otherwise detects changes to monitored event criteria 370 and automatically performs one or more actions based on the change event. For example, in some embodiments, event module evaluates a change to a monitored event and may interface with and/or otherwise cause quotation module 360 to initiate a process of electronically transmitting quote requests for a particular insurance product to one or more insurance providers on behalf of a particular consumer. In some embodiments, event module 362 may automatically initiate and transmit electronic communications to the consumer regarding an insurance product (e.g., new quote information, pending policy renewal or termination notices, marketing information for insurance products, and/or notices regarding existing policies).

In FIG. 3, system 116 includes risk data 380 and threshold data 390. Risk data 380 may comprise various types of information regarding risk tolerances and/or profiles, rate histories, rate summaries, and/or other information associated with different insurance providers. Risk data 380 may be obtained from the particular insurance providers and/or derived from historical data. Threshold data 390 may comprise one or more threshold values that, if reached or exceeded, causes event module 362 to automatically perform and/or initiate one or more actions. For example, in the embodiment illustrated in FIG. 3, threshold data 390 includes premium threshold(s) 392, time period threshold(s) 394 and parameter value threshold(s) 396. Premium threshold(s) 392 may include one or more premium threshold values that, if reached or exceeded, causes event module 362 to automatically perform and/or initiate one or more actions. Premium threshold(s) 392 may be evaluated against policy renewal premium values received from an insurance provider and/or anticipated premium values based on changes to one or more parameter values (e.g., parameter variable values 342) in connection with an analysis of risk data 380. Time period threshold(s) 394 may include one or more time periods related to a policy termination or cancellation event such that if a particular time period threshold is met or exceeded, event module 362 automatically performs and/or initiates one or more actions such as, but not limited to, initiating re-quoting (i.e., generating and transmitting electronic requests for rate quotes to insurance providers) of a particular insurance product in anticipation of an upcoming or future termination date of a policy. Parameter value threshold(s) 396 may comprise one or more parameter value thresholds that, if reached or exceeded, causes event module 362 to automatically perform and/or initiate one or more actions such as, but not limited to, re-quoting of a particular insurance product (e.g., in response to meeting or exceeding a particular age).

Thus, in operation, event module 362 monitors and/or detects changes to various monitored event criteria 370. In response to detecting a change to monitored event criteria 370, event module 362 may cause re-quoting of a particular insurance product. For example, an existing policy may have a future termination date of six months (e.g., reflected by termination event(s) 374). Time period threshold(s) 394 may indicate a four month time period. Event module 362 analyzes termination event(s) 374 in relation to time period threshold(s) 394 to determine if actions need to be taken. Thus, in this example, when a current time is within four months of the future termination date of a policy, event module 362 automatically causes quotation module 360 to generate and transmit electronic requests for rate quotes to one or more insurance providers for a particular insurance product to obtain updated quote information to provide to the consumer in anticipation of the termination date of a policy.

In some embodiment, in response to detecting a parameter value event 372 (e.g., a change to parameter variable value(s) 342 that may affect a cost for an insurance product), event module 362 automatically access and analyzes risk data 380 for one or more insurance providers to determine if the change in parameter value is likely to result in a change to a policy cost or premium (e.g., an increase or decrease). In some embodiments, event module 362 may compute or derive a cost value for an insurance product based on a change to parameter variable value(s) 342 based on risk data 380 (e.g., historical policy premium data). Event module 362 may compare the derived or computed cost value with a current policy cost or premium (e.g., as reflected in policy data 368). If the difference in premium or cost exceeds premium threshold(s) 392, event module 362 automatically causes quotation module 360 to generate and transmit electronic requests for rate quotes to one or more insurance providers for a particular insurance product to obtain updated quote information to provide to the consumer. It should be understood that in some embodiments, in response to detecting a parameter value event 372, event module 362 may automatically cause quotation module 360 to generate and transmit electronic requests for rate quotes to one or more insurance providers without utilizing risk data 380 and/or threshold(s) 392. In some embodiments, event module 362 may automatically select particular insurance providers to receive an electronic request for a rate quote based on risk data 380 (e.g., some insurance providers have different risk preferences resulting in different premium profiles and/or ranges). Event module 362 may evaluate risk data 380 corresponding to different insurance providers based on the changed parameter value and identify one or more insurance providers to receive a rate quote request via quotation module 360.

Further, in some embodiments, event module 362 may analyze the detected parameter value event(s) 372 against one or more parameter threshold(s) 396 to determine whether to re-quote an insurance product. For example, if a change in a parameter value meets or exceeds a value indicated by threshold(s) 396, event module 362 may automatically cause quotation module 360 to generate and transmit electronic requests for rate quotes to one or more insurance providers.

In some embodiments, in response to detecting policy notice data 378, event module 362 may automatically perform various actions. For example, in response to detecting a change in a premium value (e.g., received from an insurance provider in connection with a renewal notice or otherwise), event module 362 may compare the renewal premium to the current premium (e.g., as set forth in policy data 368) and, if a difference meets or exceeds premium threshold(s) 392, automatically cause quotation module 360 to generate and transmit electronic requests for rate quotes to one or more other insurance providers. It should be understood that in response to detecting policy notice data 378, such as a premium renewal or other premium-related notice, event module 362 may automatically cause quotation module 360 to generate and transmit electronic requests for rate quotes to one or more other insurance providers without evaluating the premium against premium threshold(s) 392.

If the detected policy notice data 378 comprises another type of information (e.g., a request from the insurance provider for information from the consumer, such as verification information for a good student discount, safe driver discount, etc.), event module 362 may automatically initiate electronic communications with the consumer requesting such information (e.g., via electronic mail communications or otherwise). The communications may comprise a single electronic communications or periodic communications according to a predetermined schedule or interval.

Event module 362 may also detect and/or otherwise receive a notification of a cancellation event 376 (e.g., a cancellation of an existing policy of a consumer). In response thereto, event module 362 may automatically schedule and/or initiate a marketing campaign for insurance products to the consumer. For example, based on policy data 368 that is the subject of the cancellation, the timing of various marketing electronic communications may be stored and/or initiated for the consumer. In this example, a date of policy cancellation may be received and/or obtained and, based on time period threshold(s) 394 (e.g., anticipated dates when another insurance product may be needed or due for renewal), event module 362 may automatically initiate electronic communications with the consumer for an insurance product. Event module 362 may also automatically initiate an electronic rate quote request via quotation module 360 for the consumer and include the rate quote data 366 in the electronic communications.

Figure 4:
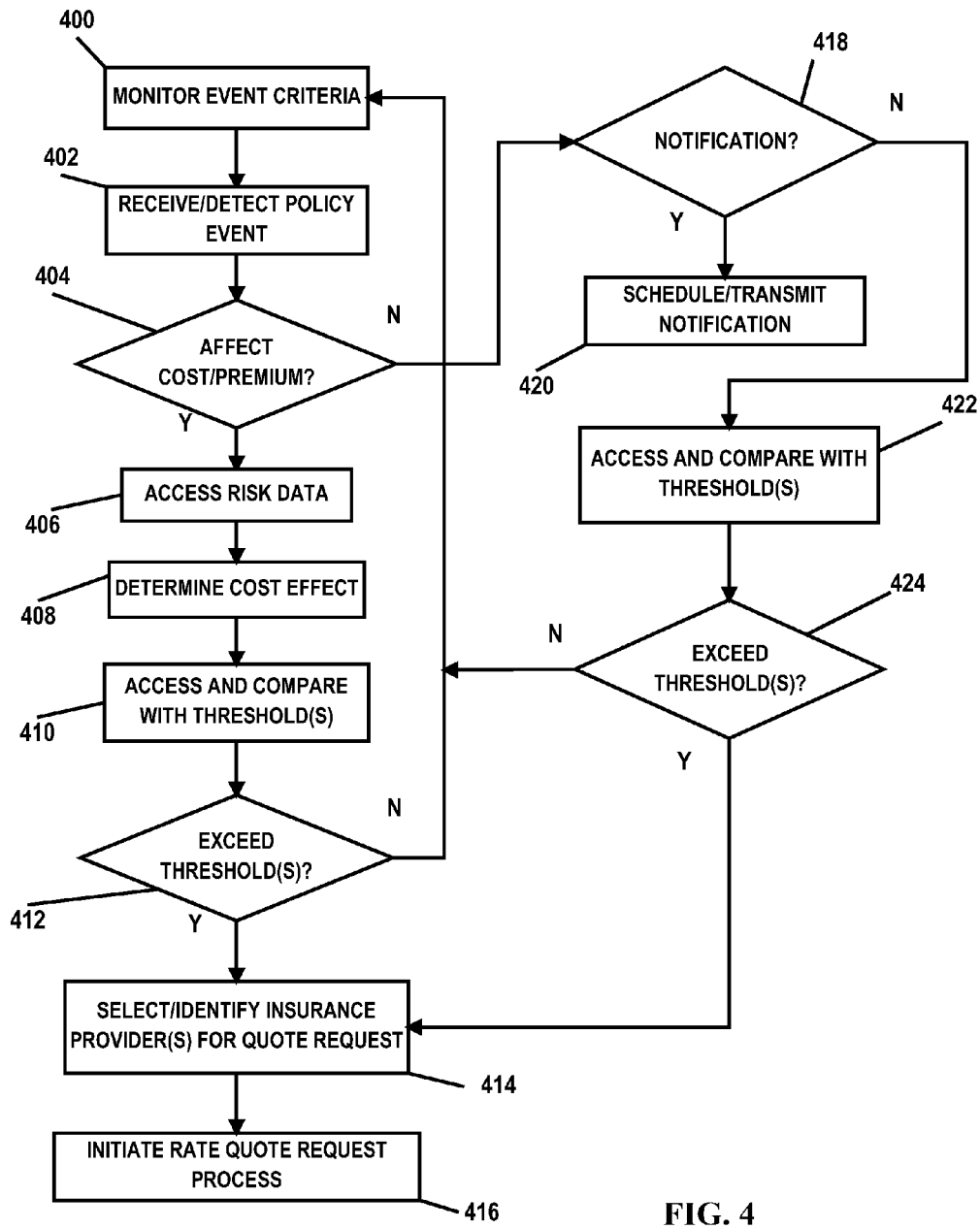
FIG. 4 is a flow diagram illustrating an embodiment of a method for policy event management.

FIG. 4 is a flow diagram illustrating an embodiment of a method for policy event management. The method begins at block 400, where event module 362 monitors for event criteria. At block 402, event monitor 362 receives, detects and/or otherwise identifies a policy event. At block 404, event module determines whether the policy event affects a cost or premium associated with an insurance product. For example, event module 362 may determine the type of policy event (e.g., parameter value event(s) 372, termination event(s) 374, etc.) to determine the effect of an insurance product. If the event affects a cost/premium of an insurance product, the method proceeds to block 406.

At block 406, event module 362 accesses risk data 380. At block 408, event module 362 analyzes risk data 380 associated with one or more insurance providers and determines an anticipated and/or estimated cost or change in cost for the insurance product. At block 410, event module 362 access threshold data 390 and compares the estimated or change in cost with, for example, premium threshold(s) 392. At decisional block 412, a determination is made whether the change or estimated cost corresponding to the event exceeds the threshold. If not, the method proceeds to clock 400, where event module 362 continues monitoring for policy events. If the change or estimated cost exceeds the threshold, the method proceeds to block 414.

At block 414, event module 362 selects and/or otherwise identifies one or more insurance providers for receiving an electronic request for a rate quote (e.g., using risk data 380). At block 416, event module 362 coordinates, interfaces with and/or otherwise causes quotation module 360 to generate and transmit an electronic request to one or more insurance providers based on the event (e.g., a change in parameter value). Upon receipt of the quote(s), the rate quote(s) may be electronically communicated to the consumer by system 116.

If at block 404 it is determined that the detected policy event does not affect a cost or premium of an insurance product, the method proceeds to block 418, where event module 362 determines whether an electronic notice communication should be prepared and transmitted to the consumer (e.g. in response to a request for information by the insurance provider or otherwise, such as policy notice event(s) 378). If so, the method proceeds to block 420, where event module 362 schedules and/or otherwise cases notice(s) to be prepared and electronically transmitted to the consumer.

If at block 418 it is determined that an event notice is not required or immediately needed, the method proceeds to block 422, where event module evaluates the detected event (e.g., a termination event 374 and/or cancellation event 376) against one or more threshold(s) 390 (e.g., time period threshold(s) 392. At decisional block 424, a determination is made whether a time period threshold has been reached or exceeded (e.g., if a current time falls with a threshold of a future termination date of a policy or is related to a cancellation date for a policy, the method proceeds to block 414. If not, the method proceeds to block 400.

Thus, embodiments of the present disclosure enable automatic policy event management by, for example, a broker for a consumer or potential consumer of an insurance product by automatically monitoring, detecting and responding to various types of policy-related events (e.g., without user intervention). Additionally, embodiments of the present disclosure enable electronic requests for rate quotes to be automatically generated and transmitted to insurance providers (e.g., without user intervention) in response to detecting and/or being notified of a policy-related event.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for policy event management, comprising:
   receiving, by a data processing system of a broker, an electronic communication from an insurance provider of an event related to a policy of a consumer serviced by the insurance provider;
   responsive to receiving the electronic communication, automatically determining, by the data processing system, whether the event meets at least one event criterion monitored by the data processing system of the broker; and
   responsive to determining that the event corresponds to at least one event criterion monitored by the broker, automatically initiating, by the data processing system, an action related to the event; and
   wherein the event comprises a change in a policy premium; and
   wherein the at least one event criterion comprises the change in the policy premium exceeding a predetermined threshold, and further comprising, responsive to determining that the change in the policy premium exceeds the predetermined threshold, the action comprises automatically transmitting an electronic request for an insurance quote to at least one other insurance provider on behalf of the consumer.

2. The method of claim 1, wherein the event further comprises a future termination date for the policy.

3. The method of claim 2, further comprising at least one other event criterion comprising a predetermined time period prior to the future termination date, and wherein the action comprises automatically transmitting another electronic request for an insurance quote to at least one insurance provider on behalf of the consumer.

4. The method of claim 1, wherein the event further comprises a change to at least one parameter value associated with the policy.

5. The method of claim 4, further comprising at least one other event criterion comprising a change to the at least one parameter value, and wherein the action comprises automatically transmitting another electronic request for an insurance quote to at least one insurance provider on behalf of the consumer.

6. The method of claim 1, wherein the event further comprises receiving a notice to produce information related to the policy, and further comprising, responsive to receiving the notice, the action comprises automatically transmitting an electronic communication to the customer regarding the notice.

7. A policy event management system, comprising:
   a data processing system operable to receive, by a broker, an electronic communication from an insurance provider indicating an event related to a policy of a consumer serviced by the insurance provider;
   an event module operable to, responsive to receiving the electronic communication, automatically determine whether the event meets at least one event criterion monitored by the broker; and
   wherein the event module is operable to, responsive to determining that the event corresponds to at least one event criterion monitored by the broker, automatically initiate an action related to the event; and
   wherein the event comprises a change in a policy premium; and
   wherein the at least one event criterion comprises the change in the policy premium exceeding a predetermined threshold, and wherein the event module is operable to, responsive to determining that the change in the policy premium exceeds the predetermined threshold, the action comprises initiating a quotation module operable to automatically transmit an electronic request for an insurance quote to at least one other insurance provider on behalf of the consumer.

8. The system of claim 7, wherein the event further comprises a future termination date for the policy.

9. The system of claim 8, further comprising at least one other event criterion comprising a predetermined time period prior to the future termination date, and wherein the event module is operable to, responsive to determining that the current date falls within the predetermined time period of the future termination date, the action comprises initiating a quotation module operable to automatically transmit another electronic request for an insurance quote to at least one insurance provider on behalf of the consumer.

10. The system of claim 7, wherein the event further comprises a change to at least one parameter value associated with the policy.

11. The system of claim 10, further comprising at least one other event criterion comprising a change to the at least one parameter value, and wherein the action comprises initiating a quotation module operable to automatically transmit another electronic request for an insurance quote to at least one insurance provider on behalf of the consumer.

12. A policy event management method, comprising:
storing, by a broker in a data processing system, information associated with a policy for an insurance product between a consumer and an insurance provider;
monitoring, by the data processing system, for a change associated with at least one parameter value associated with the policy;
responsive to detecting a change to at least one parameter value associated with the policy, automatically determining by the data processing system whether the change may cause a change to a premium paid by the consumer for the insurance product; and
responsive to determining that the change may cause a change to a premium paid by the consumer for the insurance product, automatically transmitting an electronic request for an insurance quote to at least one other insurance provider on behalf of the consumer for the insurance product.

13. The method of claim 12, further comprising identifying at least one other insurance provider that causes a change to the premium based on the change to the at least one parameter value.

14. The method of claim 12, wherein monitoring for the change associated with the at least one parameter value comprises receiving an electronic communication from the insurance provider indicating the change.

15. The method of claim 12, further comprising, responsive to detecting a change to at least one parameter value associated with the policy, analyzing risk data corresponding to one or more different insurance providers based on the changed parameter value.

16. The method of claim 15, further comprising selecting at least one of the different insurance providers for submitting thereto the electronic request for the insurance quote based on the analyzed risk data.

* * * * *